(12) United States Patent
Tzeng et al.

(10) Patent No.: US 7,286,547 B2
(45) Date of Patent: Oct. 23, 2007

(54) DYNAMIC ADJUST MULTICAST DROP THRESHOLD TO PROVIDE FAIR HANDLING BETWEEN MULTICAST AND UNICAST FRAMES

(75) Inventors: Shrjie Tzeng, Fremont, CA (US); Yi-Hsien Hao, Saratoga, CA (US)

(73) Assignee: Broadcom Corporation, Irvine, CA (US)

( * ) Notice: Subject to any disclaimer, the term of this patent is extended or adjusted under 35 U.S.C. 154(b) by 1041 days.

(21) Appl. No.: 10/163,991

(22) Filed: Jun. 7, 2002

(65) Prior Publication Data

US 2003/0212814 A1 Nov. 13, 2003

Related U.S. Application Data

(60) Provisional application No. 60/378,649, filed on May 9, 2002.

(51) Int. Cl.
*H04L 12/28* (2006.01)

(52) U.S. Cl. .......................... 370/412; 370/468
(58) Field of Classification Search ............ None
See application file for complete search history.

(56) References Cited

U.S. PATENT DOCUMENTS

| | | | |
|---|---|---|---|
| 5,541,912 A * | 7/1996 | Choudhury et al. | ........ 370/412 |
| 5,898,687 A | 4/1999 | Harriman et al. | |
| 6,061,351 A | 5/2000 | Erimli et al. | |
| 6,118,761 A | 9/2000 | Kalkunte et al. | |
| 6,167,029 A * | 12/2000 | Ramakrishnan | ............ 370/235 |
| 6,185,185 B1 | 2/2001 | Bass et al. | |
| 6,456,590 B1 * | 9/2002 | Ren et al. | ................... 370/229 |
| 6,535,484 B1 * | 3/2003 | Hughes et al. | ............. 370/230 |
| 6,788,697 B1 * | 9/2004 | Aweya et al. | ............... 370/412 |
| 2004/0066785 A1 * | 4/2004 | He et al. | ............... 370/395.21 |

FOREIGN PATENT DOCUMENTS

| | | |
|---|---|---|
| GB | 2 343 344 A | 5/2000 |
| WO | WO91/09366 | 6/1991 |
| WO | WO 00/00899 | 1/2000 |

OTHER PUBLICATIONS

Choudhury et al., "Dynamic Queue Length Thresholds for Shared-Memory Packet Switches", Apr. 1998, pp. 130-140.*
"Multicasting in Myrinet—A High Speed, Wormhole-Routing Network," Mario Gerla, Prasasth Palnati, Simon Walton, Computer Science Dept., UCLA; Emilio Leonardi, Fabio Neri, Politecnico di Torino, 1996.

* cited by examiner

*Primary Examiner*—Chau Nguyen
*Assistant Examiner*—Jung Park
(74) *Attorney, Agent, or Firm*—Squire, Sanders & Dempsey L.L.P.

(57) ABSTRACT

A network device for managing data flow can have a data port configured to receive data, a plurality of pointers for pointing to the data received, and a queue for queuing the plurality of pointers. The queue can be configured to have at least one dynamic threshold therein. Furthermore, the network device can have a control module configured to adjust the at least one dynamic threshold with respect to the data flow.

40 Claims, 3 Drawing Sheets

DYNAMIC ADJUST MULTICAST DROP THRESHOLD TO PROVIDE FAIR HANDLING BETWEEN MULTICAST AND UNICAST FRAMES

CROSS REFERENCE TO RELATED APPLICATIONS

This application claims priority of U.S. Provisional Patent Applications Ser. No. 60/378,649, filed May 9, 2002. The contents of the provisional application is hereby incorporated by reference.

BACKGROUND OF THE INVENTION

1. Field of the Invention

The present invention relates to a method and an apparatus for managing data flow in a network communication environment such as Ethernet, Fast Ethernet and Gigabit Ethernet environments. In particular, the present invention relates to a network device for managing data flow based on a transmission-side flow control scheme. The network device of the invention can be implemented on a semiconductor substrate such as a silicon chip. Furthermore, the present invention relates to a method of managing data flow also based on a transmission-side flow control scheme which can be implemented on a semiconductor substrate or in a software application, or a combination of both.

2. Description of the Related Art

High speed networking devices, such as switches and switching systems are becoming more significant in the communication network environment, and therefore are in great demand. As the amount of data and the communication between network devices increases on the network, the possibility of data congestion on the network also increases. For example, when multiple consecutive bursts of large data packets are received at a destination device on the network, congestion of data flow can occur which can significantly slow down the traffic and flow of information. Accordingly, fair and efficient data flow control and management systems are important in minimizing or possibly eliminating such data congestion.

SUMMARY OF THE INVENTION

One example of the present invention can provide a method of managing data flow. The method can include the steps of monitoring a queue position with respect to the data flow in a network device, and adjusting at least one dynamic threshold when the queue position is at a predetermined threshold. In addition, the method can include the step of implementing an action with respect to the data flow when the at least oone dynamic threshold is adjusted.

In another example, the present invention can relate to a network device for managing data flow. The network device can include a data port configured to receive data, a plurality of pointers for pointing to the data received, and a queue for queuing the plurality of pointers, wherein the queue can be configured to have at least one dynamic threshold therein. Additionally, the network device can include a control module configured to adjust the at least one dynamic threshold with respect to the data flow.

Furthermore, another example of the present invention can provide a system for managing data flow. The means for managing data flow can have a monitoring means for monitoring a queue position with respect to the data flow in a network device, an adjusting means for adjusting at least one dynamic threshold when the queue position is at a predetermined threshold, and an implementing means for implementing an action with respect to the data flow when the at least one dynamic threshold is adjusted.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

Figure 1:
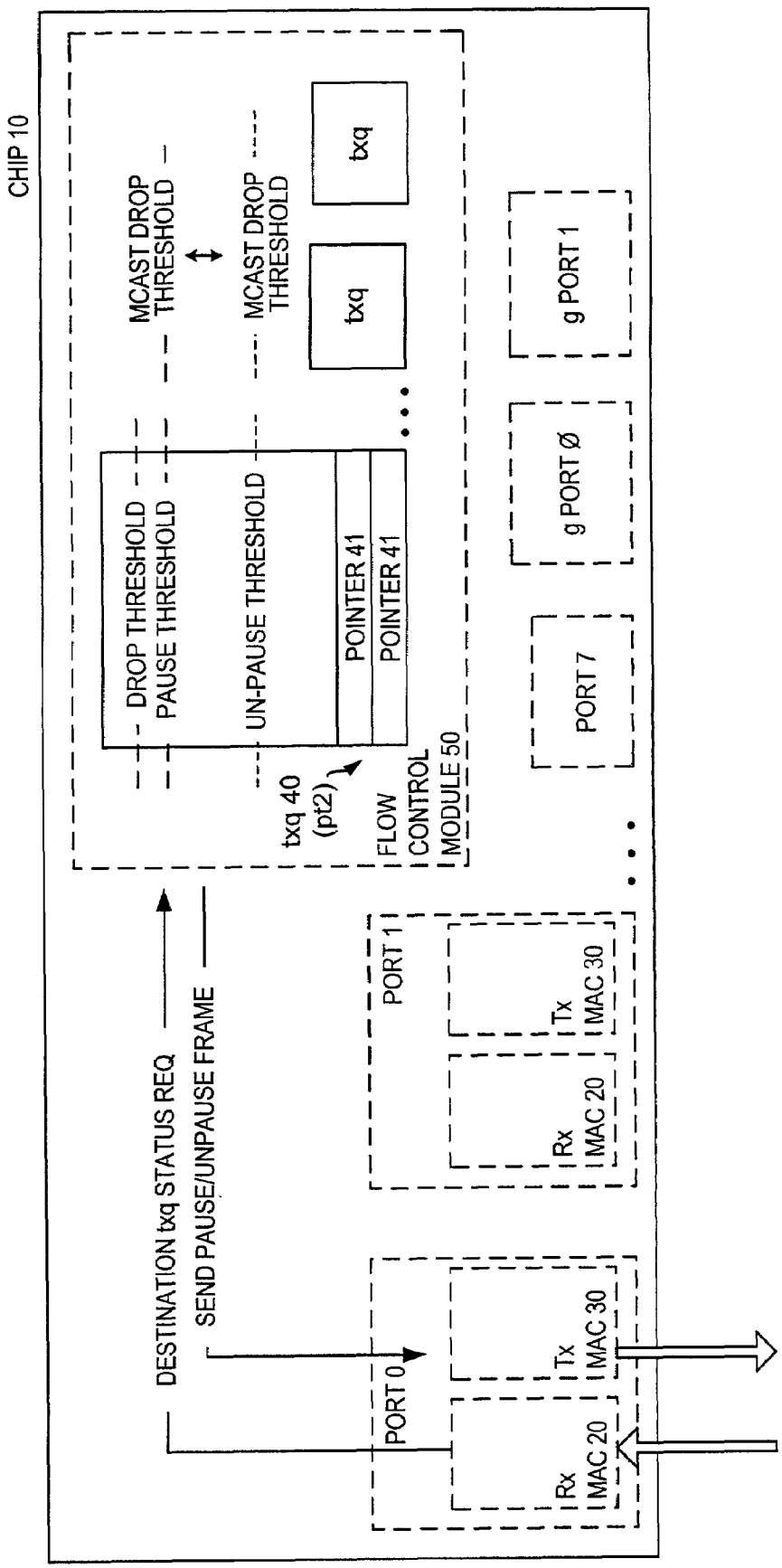
FIG. 1 illustrates one example of a configuration for managing data flow according to the present invention.

FIG. 1 illustrates one example of a hardware configuration that can manage data flow based on a transmission-side flow control scheme in a network device, such as a switch or a switching chip, in accordance with the present invention. The example shown in FIG. 1 can manage data flow by dynamically adjusting a multicast drop threshold (also referred to in FIG. 1 as mcast drop threshold), and thereby provide fair handling of multicast and unicast data flow. The hardware configuration of FIG. 1 can be in an integrated, modular and single chip solution, and therefore can be embodied on a semiconductor substrate, such as silicon. Alternatively, the hardware configuration of FIG. 1 can be a plurality of discrete components on a circuit board.

The configuration as shown in FIG. 1, illustrates a chip 10 which can have a plurality of ports, such as port 0-port 7, and gports 0 & 1. In this example, the chip 10 can have 8 fast Ethernet ports port 0-port 1, 2 Gigabit ports gports 0 & 1 with one expansion port that can chain other chips together (expansion port not shown). Furthermore, the chip 10 can include an embedded frame buffer memory (also not shown) with a plurality of pointers 41 that represent or point to a particular location or section in the frame buffer memory.

Each port can be a receiving port as well as a transmitting port since each port can contain a receiving Media Access Controller Rx MAC 20 and a transmitting Media Access Controller Tx MAC 30 for receiving and transmitting data, respectively. The data received and transmitted, based on the present invention, can be in any data format configured for a network environment. For instance, the data can be in the format of a data packet, a data frame, or a data cell. Moreover, the data discussed herein can be, at least, a unicast data or a unicast frame and/or a multicast data or a multicast frame. A unicast frame can be a data frame that is relayed to only one destination port. In contrast, a multicast frame can be a data frame that is relayed to a plurality of destination port.

The chip 10 of FIG. 1 can also contain a plurality of transmitting queues txq 40, wherein each txq 40 can be configured to correspond to a particular destination port. In the example shown in FIG. 1, only one of the plurality of txq 40 is shown. The txq 40 as shown corresponds to destination port 2, pt 2. Each txq 40 can have a plurality of static thresholds for controlling or managing the data flow of unicast frames. Each static threshold can be preprogrammed with a predetermined value or at a predetermined setting. In this example, the txq 40 can have three static thresholds, them being an unicast drop threshold or drop threshold, an unicast pause threshold or pause threshold and an unicast un-pause threshold or un-pause threshold preprogrammed therein wherein each threshold has a preprogrammed predetermined value.

It is noted that in one embodiment of the present invention, each txq 40 can have a plurality of unicast static thresholds for controlling or managing the managing the data flow of unicast frames, together with one multicast static threshold for controlling and managing the data flow of multicast frames when fair handling between unicast and multicast frames are not required or needed. Each unicast and multicast static threshold can be preprogrammed with a predetermined value or at a predetermined setting. For example, if fair handling between unicast and multicast frames are not required or needed, then the txq 40 can have three unicast static thresholds, them being an unicast drop threshold or drop threshold, an unicast pause threshold or pause threshold and an unicast un-pause threshold or un-pause threshold, together with a multicast static theshold, that being a multicast drop threshold, preprogrammed therein wherein each threshold has a preprogrammed predetermined value.

In an alternative embodiment for example, the txq 40 can have at least one dynamic threshold for controlling or managing the data flow of multicast frames. Similar to the static thresholds, the at least one dynamic threshold can be preprogrammed with a predetermined value or at a predetermined setting. In this example, the txq 40 can have a dynamic threshold, that being the multicast drop threshold or mcast drop threshold. In other words, the mcast drop threshold according to this example can be preprogrammed to be dynamic rather than static. Therefore the mcast drop threshold can have or be associated with two different threshold values or settings within the txq 40. The mcast drop threshold can be a dynamic threshold because it can be preprogrammed to have a value or setting being equal to that of the pause threshold, and can also be preprogrammed to have another value or setting being equal to that of the un-pause threshold. In other words, the txq 40 of the invention can be configured to have a dynamic mcast drop threshold that can take on or be associated with either one of the dynamic threshold value or setting at all times, depending on the circumstance. It is noted that the mcast drop threshold of this example can take on or have a different threshold value or setting depending on the circumstances of the unicast thresholds and the conditions of the data flow in the chip 10.

Furthermore, each txq 40 can be configured to queue a plurality of pointers 41. As mentioned above, each pointer 41 represents or points to a particular location or section where the frames are buffered in the frame buffer memory (not shown).

Each txq 40 can be coupled to a flow control module 50, wherein the flow control module 50 can perform a plurality of actions, tasks and/or functions. In this example, the flow control module 50 can adjusts the dynamic mcast drop threshold from one dynamic threshold value to another when predetermined circumstances surrounding the unicast thresholds are met and/or when a particular data flow condition is met. Moreover, the flow control module 50 can monitor the queuing logic of the pointers in the txq 40. The flow control module 50 can also be configured to implement tasks or actions with respect to the ports. For instance, the flow control module 50 can receive requests from the ports, and/or can transmit instructions to the ports, such as instructions to send out a pause or un-pause frame.

Figure 2:
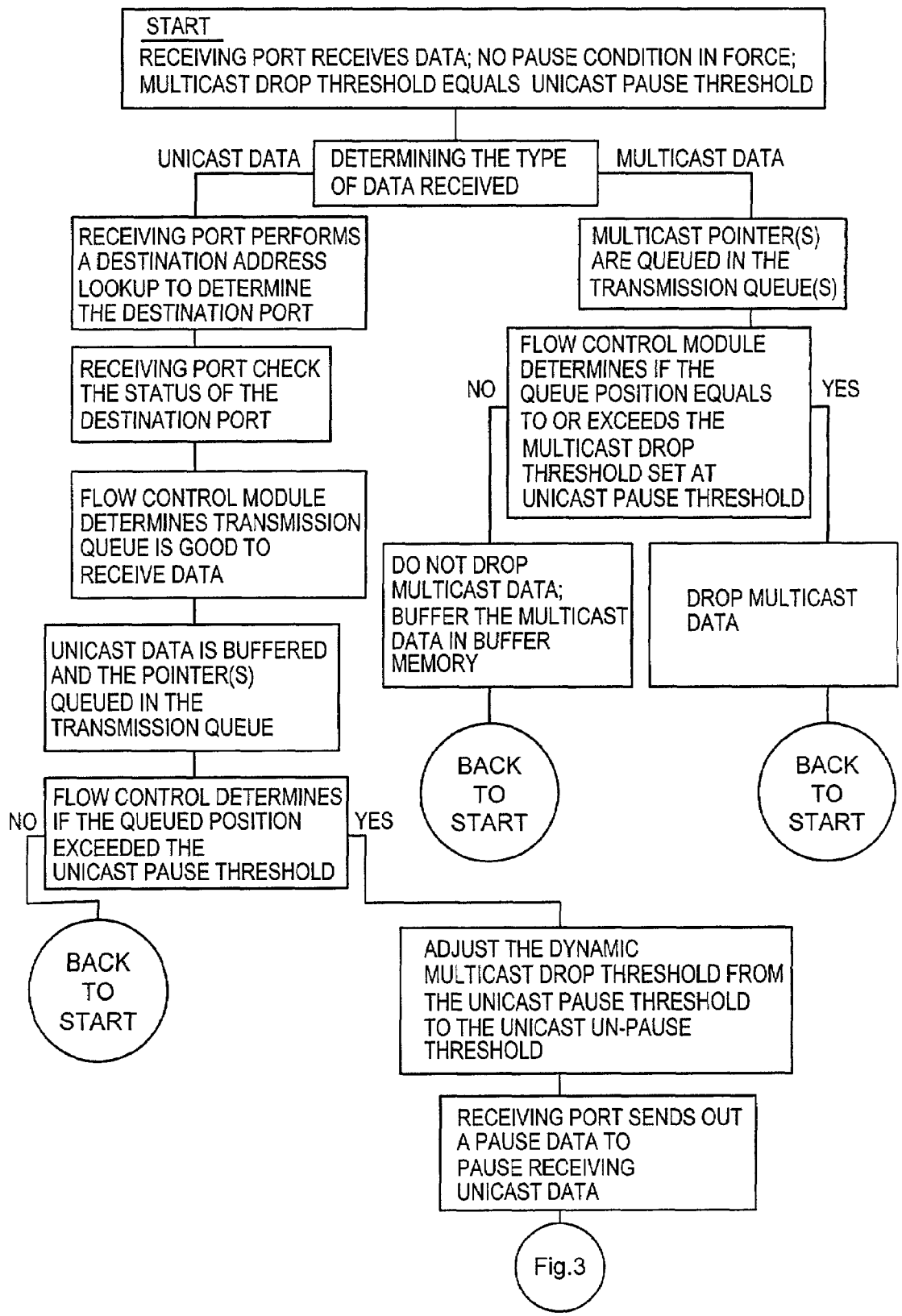
FIG. 2 illustrates a flow chart illustrating one example of a method of managing data flow according to the present invention.
Figure 3:
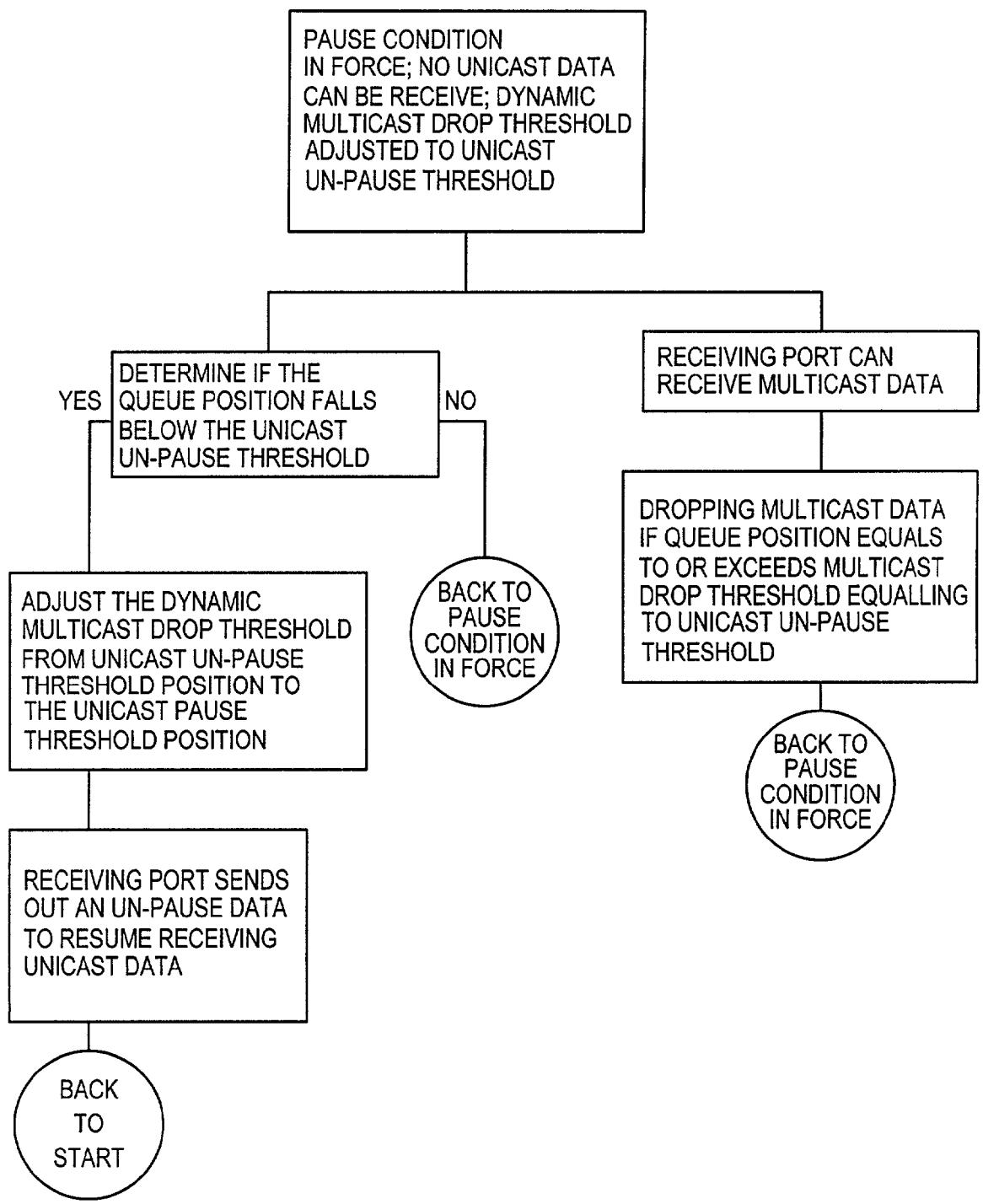
FIG. 3 illustrates a flow chart illustrating one example of a method of managing data flow according to the present invention.

FIGS. 2 and 3 illustrate one example of a method of managing data flow based on a transmission-side flow control scheme, in accordance with the present invention. The method of the invention can be implemented in hardware, or software, or a combination of both hardware and software.

According to this example, a dynamic mcast drop threshold can be adjusted within a txq 40 of a network device based on various circumstances such as the type of data received, the queue position, and the data flow condition in the network device.

As shown in FIG. 2, at least one receiving port can receive data, such as frames or packets, provided that a pause condition is not in force with respect to the receiving port. The present invention can determine the type of frames received, whether the frame is a unicast frame or a multicast frame, since either one or both unicast frames and multicast frames can be received at each and every one of the plurality of receiving ports. If a unicast frame is received, the receiving port can perform a destination address lookup to determine the destination port destined for the unicast frame. Upon such determination, the receiving port can check the status of the destination port by sending a destination txq request to, for example, a flow control module 50 (shown in FIG. 1). The flow control module 50 can keep track of or monitor the status of at least one txq. In other words, the flow control module 50 can monitor a queue position or a number of pointers queued inside the txq for the destination port, the pointers representing a location or section of buffered data in a buffer memory.

According to the example, a txq can include a plurality of preprogrammed static unicast thresholds such as a drop threshold, a pause threshold, and an un-pause threshold. The unicast drop threshold can be preprogrammed to be a highest threshold. The unicast pause threshold can be preprogrammed to be a second highest threshold, and the unicast un-pause threshold can be preprogrammed to be a lowest threshold. Moreover, a txq can also include a dynamic multicast threshold that can, at the initial setting, have a threshold value or setting equal to the unicast pause threshold.

It is noted that in the alternative, for example, a txq can have a plurality of unicast static thresholds for controlling or managing the managing the data flow of unicast frames, together with one multicast static threshold for controlling and managing the data flow of multicast frames when fair handling between unicast and multicast frames are not required or needed. Each unicast and multicast static threshold can be preprogrammed with a predetermined value or at a predetermined setting. For example, if fair handling between unicast and multicast frames are not required or needed, then the txq 40 can have three unicast static thresholds, them being an unicast drop threshold or drop threshold, an unicast pause threshold or pause threshold and an unicast un-pause threshold or un-pause threshold, together with a multicast static theshold, that being a multicast drop threshold, preprogrammed therein wherein each threshold has a preprogrammed predetermined value.

With respect to the dynamic adjust multicast threshold embodiment, if the flow control module 50 determines that the queue position or the number of pointers queued inside the transmission queue has not exceeded or is not greater than the unicast pause threshold predetermined in the transmission queue, the flow control module 50 can indicate to the receiving port that the unicast drop threshold has not been reached or the unicast pause threshold has not been exceeded, and therefore the receiving port can buffer the received unicast frame in the buffer memory.

The unicast frame can thereafter be buffered in a location or section of the buffer memory, and at least one pointer representing the section of the buffered data can be queued in the txq corresponding to the destination port.

As shown in FIG. 2, if the queuing of the at least one pointer in the transmission queue does not cause the queue position or the number of pointers queued to exceed the unicast pause threshold, then the receiving port can continue to receiving unicast frames as well as multicast frames in that port. However, if the queuing of the at least one pointer in the transmission queue causes the number of pointers queued inside the txq exceeds or is greater than the unicast pause threshold, then the flow control module 50 can adjust the mcast drop threshold from the unicast pause threshold position to the unicast un-pause threshold position. In other words, when the queue position or the number of pointers queued within the transmission queue is greater than or exceeds the preprogrammed unicast pause threshold, the dynamic mcast drop threshold can be adjusted from the unicast pause threshold, which can be at a higher initial setting, to a different threshold value or setting, that being the unicast un-pause threshold, which can be at a lower setting, for this example. Furthermore, the flow control module 50 can direct the tx MAC 30 of the receiving port to send out a pause data frame which can pause the receipt of unicast frames therein. Consequently, no unicast frames can be received until the flow control module 50 instructs the receiving port to send an un-pause frame. In addition, and any multicast frame received in the receiving port will be subjected to a lower mcast drop threshold. Given these circumstances, the present invention can transmit data frames to the destination ports at line speed, and can therefore decrease the pointers or entries in the transmission queue as the buffered frames are transmitted out.

As mentioned above, the flow control module 50 can instruct a receiving port to send a pause frame to pause the sending of unicast frames if the number of pointers queued in the txq exceeds the unicast pause threshold. Upon implementing the instruction from the flow control module 50, the receiving port no longer can receive any unicast frames until the flow control module 50 instructs the same receiving port to send out an un-pause frame to resume receiving unicast frames.

According to FIG. 3 of the example, when a pause condition is in force in a receiving port, no unicast frames can be received until the receiving port sends out an un-pause frame. In addition, any multicast frames received in the receiving port will be dropped since a lower dynamic multicast drop threshold has been set. Thus, the present invention can transmit the buffered data to the destination ports at line speed, and therefore the pointers or entries in the transmission queue(s) can decrease.

When the queue position or the number of pointers queued in a txq decreases to a point where the queue position falls below or is less than the preprogrammed unicast un-pause threshold, the flow control module 50 can adjust the mcast drop threshold from the unicast un-pause threshold position back to the unicast pause threshold position. In other words, when the queue position or the number of pointers queued within the txq is lesser than or falls below the preprogrammed unicast un-pause threshold, the dynamic multicast drop threshold can be adjusted from the unicast un-pause threshold, which can be at a lower setting, to a different threshold value or setting, that being the unicast pause threshold, which can have a higher setting, for this example. Furthermore, the flow control module 50 can direct the tx MAC 30 of the receiving port to send out an un-pause frame which can un-pause the receipt of or resume receiving unicast frames therein. Consequently, the receiving port can resume receiving unicast frames until the flow control module 50 instructs the receiving port to send a pause frame. Additionally, any multicast frames received in the receiving port will be subjected to a higher mcast drop threshold. Given these circumstances, the present invention can receive and buffer additional unicast frames and multicast frames. As such, the txq can resume queuing additional pointers therein.

As mentioned above, the flow control module 50 can instruct a receiving port to send an un-pause frame to resume receiving of unicast frames if the queue position in the txq falls below the unicast un-pause threshold. Upon implementing the instruction from the flow control module 50, the receiving port resumes receiving unicast frames until the flow control module 50 instructs the same receiving port to send out a pause frame to pause the sending of unicast frames.

It is noted that a receiving port can receive multicast data whether a pause or un-pause condition is in force in the receiving port. As such, FIGS. 2 and 3 show that if a receiving port receives a multicast frame, the multicast frame can be dropped if the queue position or the number of the pointers queued in the txq(s) either equals to, exceeds or is greater than the dynamic mcast drop threshold if the mcast drop threshold is adjusted to the level of the unicast pause threshold. Similarly, the multicast data can be dropped if the queue position equals to or exceeds the dynamic mcast drop threshold if the mcast drop threshold if adjusted to the level of the unicast un-pause threshold. On the other hand, if the queue position or the number of the pointers queued in the txq(s) is less than the dynamic mcast drop threshold regardless where the threshold is adjusted, then the multicast frame can be buffered and the pointer(s) representing the buffered multicast data can be queued in the transmission queue(s).

The above-disclosed configuration of the present invention can be embodied in a hardware configuration such as a semiconductor substrate. Furthermore, the methods of the invention can be implemented in hardware, or software, or a combination of both hardware and software. In addition, a person of skill in the art with respect to semiconductor design and manufacturing would be able to implement the various elements and methods of the present invention onto a single semiconductor substrate, based upon the architectural description discussed above.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method of managing data flow, the method comprising the steps of:
   monitoring a queue position with respect to the data flow in a network device;
   adjusting at least one dynamic threshold when the queue position is at a predetermined threshold; and implementing an action with respect to the data flow when the at least one dynamic threshold is adjusted, wherein the step of adjusting the at least one dynamic threshold further comprises adjusting the dynamic threshold when the predetermined threshold is less than a first static threshold, and when the data flow condition is a pause condition.

2. The method of claim 1, wherein the step of adjusting the at least one dynamic threshold further comprises:
adjusting the dynamic threshold when the predetermined threshold is greater than a first static threshold.

3. The method of claim 2, wherein the step of adjusting the at least one dynamic threshold further comprises:
adjusting the dynamic threshold from the first static threshold to a second static threshold.

4. The method of claim 3, wherein the step of implementing the action further comprises:
sending a pause frame from a receiving port.

5. The method of claim 3, wherein the step of adjusting the at least one dynamic threshold further comprises:
adjusting the dynamic threshold wherein the first static threshold comprises a pause threshold.

6. The method of claim 3, wherein the step of adjusting the at least one dynamic threshold further comprises:
adjusting the dynamic threshold wherein the second static threshold comprises an un-pause threshold.

7. The method of claim 3, wherein the step of adjusting the at least one dynamic threshold further comprises:
adjusting the dynamic threshold wherein the dynamic threshold comprises a multicast drop threshold.

8. The method of claim 1, further comprising the step of:
monitoring a data flow condition in the network device.

9. The method of claim 1, wherein the step of adjusting the at least one dynamic threshold further comprises:
adjusting the dynamic threshold from the first static threshold to a second static threshold.

10. The method of claim 9, wherein the step of implementing the action further comprises:
send an un-pause frame from a receiving port.

11. The method of claim 9, wherein the step of adjusting the at least one dynamic threshold further comprises:
adjusting the dynamic threshold wherein the first static threshold comprises an un-pause threshold.

12. The method of claim 9, wherein the step of adjusting the at least one dynamic threshold further comprises:
adjusting the dynamic threshold wherein the second static threshold comprises a pause threshold.

13. The method of claim 9, wherein the step of adjusting the at least one dynamic threshold further comprises:
adjusting the dynamic threshold wherein the dynamic threshold comprises a multicast drop threshold.

14. A network device for managing data flow, said network device comprising:
a data port configured to receive data;
a buffer memory configured to buffer the data received;
a plurality of pointers for pointing to a section of the buffer memory;
a queue for queuing the plurality of pointers, said queue configured to have at least one dynamic threshold therein; and
a control module configured to monitor and adjust the at least one dynamic threshold with respect to the data flow wherein,
the control module is configured to adjust the at least one dynamic threshold when a number of the plurality of pointers in the queue is less than the first static threshold, and when the data flow condition is a pause condition.

15. The network device of claim 14, wherein the queue is further configured to include a first static threshold and a second static threshold.

16. The network device of claim 15, wherein the control module is configured to adjust the at least one dynamic threshold when a number of plurality of pointers in the queue is greater than the first static threshold.

17. The network device of claim 16, wherein the control module is configured to adjust the at least one dynamic threshold from the first static threshold to the second static threshold.

18. The network device of claim 17, wherein the data port is further configured to send a pause frame.

19. The network device of claim 17, wherein the queue is configured to include the first static threshold, said first static threshold comprising a pause threshold.

20. The network device of claim 17, wherein the queue is configured to include the second static threshold, said second static threshold comprising an un-pause threshold.

21. The network device of claim 17, wherein the control module is configured to adjust the at least one dynamic threshold, the dynamic threshold comprising a multicast drop threshold.

22. The network device of claim 15, wherein the control module is further configured to monitor a data flow condition.

23. The network device of claim 14, wherein the control module is configured to adjust the at least one dynamic threshold from the first static threshold to the second static threshold.

24. The network device of claim 23, wherein the data port is further configured to send an un-pause frame.

25. The network device of claim 23, wherein the queue is configured to include the first static threshold, said first static threshold comprising an un-pause threshold.

26. The network device of claim 23, wherein the queue is configured to include the second static threshold, said second static threshold comprising a pause threshold.

27. The network device of claim 23, wherein the control module is configured to adjust the at least one dynamic threshold, the dynamic threshold comprising a multicast drop threshold.

28. A system for managing data flow, said system comprising:
a monitoring means for monitoring a queue position with respect to the data flow in a network device;
an adjusting means for adjusting at least one dynamic threshold when the queue position is at a predetermined threshold; and
an implementing means for implementing an action with respect to the data flow when the at least one dynamic threshold is adjusted wherein
the adjusting means adjusts the at least one dynamic threshold when the predetermined threshold is less than a first static threshold, and when the data flow condition is a pause condition.

29. The system of claim 28, wherein the adjusting means adjusts the at least one dynamic threshold when the predetermined threshold is greater than a first static threshold.

30. The system of claim 29, wherein the adjusting means adjusts the at least one dynamic threshold from the first static threshold to a second static threshold.

31. The system of claim 30, wherein the implementing means implements the action by sending a pause frame.

32. The system of claim 30, wherein the adjusting means adjusts the at least one dynamic threshold such that the first static threshold comprises a pause threshold.

33. The system of claim 30, wherein the adjusting means adjusts the at least one dynamic threshold such that the second static threshold comprises an un-pause threshold.

34. The system of claim 30, wherein the adjusting means adjusts the at least one dynamic threshold such that the dynamic threshold comprise a multicast drop threshold.

35. The system of claim 28, further comprising:
a monitoring means for monitoring a data flow condition in the network device.

36. The system of claim 28, wherein the adjusting means adjusts the at least one dynamic threshold from the first static threshold to a second static threshold.

37. The system of claim 36, wherein the implementing means implements the action by sending an un-pause frame.

38. The system of claim 36, wherein the adjusting means adjusts the at least one dynamic threshold such that the first static threshold comprises an un-pause threshold.

39. The system of claim 36, wherein the adjusting means adjusts the at least one dynamic threshold such that the second static threshold comprises a pause threshold.

40. The system of claim 36, wherein the adjusting means adjusts the at least one dynamic threshold such that the dynamic threshold comprises a multicast drop threshold.

* * * * *